Aug. 20, 1929.   J. H. ROBERTSON   1,725,673
MICROMETER DEVICE
Filed July 1, 1925   2 Sheets-Sheet 1

INVENTOR.
Joseph H. Robertson
BY Walter W. Burns
ATTORNEYS.

Aug. 20, 1929.  J. H. ROBERTSON  1,725,673
MICROMETER DEVICE
Filed July 1, 1925   2 Sheets-Sheet 2

INVENTOR.
Joseph H. Robertson
BY Walter W Burns
ATTORNEYS.

Patented Aug. 20, 1929.

1,725,673

UNITED STATES PATENT OFFICE.

JOSEPH H. ROBERTSON, OF DEL RAY, VIRGINIA.

MICROMETER DEVICE.

Application filed July 1, 1925. Serial No. 40,880.

This invention relates to micrometer adjustment devices and has particular relation to those devices wherein accurate readings are desired even for small changes.

In the micrometer devices at present in use, the scale divisions which mark the changes, while accurate, are difficult to read, usually require a great deal of counting of scale divisions and in the case of use on telescopic sights of rifles, often requres that reference be made to a tabulation sheet. These conditions lead to inaccurate readings and in the case of the use on rifle sights, to inaccurate shooting. Moreover, it has been found that the placing of the scale markings far enough apart so that they will not be confused with each other, makes it necessary to estimate interpolations between the scale division markings.

The use of large drums makes the instrument too bulky for convenience.

The primary object of this invention is the provision of an improved device for measuring and showing accurately, micrometer changes.

Another object of my invention is the provision of an improved device for reading micrometer changes having an index movable relative to the scale and movable with but at a greater speed than the thread of the micrometer screw itself.

Still another object of my invention is the provision of an improved device for reading micrometer changes having an index movable along a path parallel to the axis of the micrometer screw at a faster rate than the axial movement of the micrometer screw.

Another and further object of my invention is the provision of an improved device for reading micrometer changes, having provision for a plurality of independent scales to make the device applicable in different relations.

Another and still further object of my invention is an improved device for reading micrometer changes having provision for setting the scale to change the reference point, as for changed conditions, as may occur in use on, for example, rifle sights.

Other and further objects will be apparent to those skilled in the art, from a reading of the complete specification and claims.

Referring to the drawing wherein I have illustrated my device generally and also particularly as applied to the adjustment of the sights of rifles, Fig. 1 is an elevational view of my invention as applied to the telescopic sight of a rifle and on a larger scale than would probably be used in actual practice.

Similar reference characters refer to the same or similar parts throughout the views of the drawing.

Figure 1:
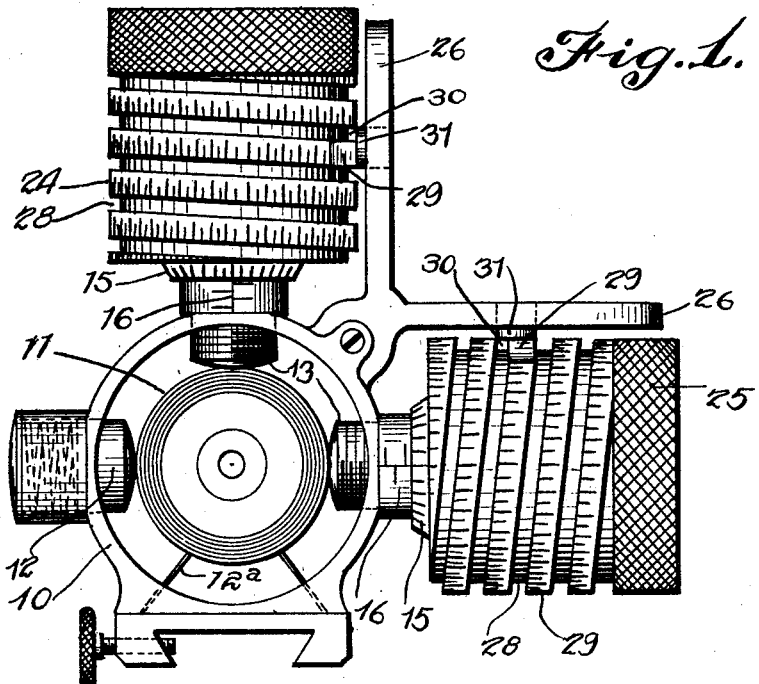

Referring particularly to Figs. 1 to 4, 10 designates the frame of the mount surrounding the rear end telescopic rifle sight 11 which is to be adjusted. The numeral 13 designates a spring pressed plunger which has a continuous yielding pressure on one side of the telescope. A wire spring $12^a$ is provided to continuously exert an upward pressure on the telescopic sight 11. Arranged 90° apart are threaded micrometer screws 13 having thimbles 14 attached thereto, which thimbles are provided at their inner edges with scales 15 cooperating with an index line and scale 16. At the outer end of the thimble 14 is an annular head 17. All of the above structure, is old in the art and, per se, forms no part of my invention.

By turning on the head 17 and the thimble 16, the micrometer screw may be moved inwardly and outwardly to adjust the position of the telescope.

In my preferred embodiment, I provide a bushing 20 having a bored opening at one end of a size to easily receive the main body of the thimble 14. This opening is of sufficient length to receive substantially the whole length of the body of this thimble 14. The other end of the bushing 20 is provided with a boring 21 which is large enough to receive the head 17 on the outer end of the thimble 14. This opening 21 is threaded substantially throughout its length to receive adjacent the head 17, a screw 22 which, when turned down against the end of the thimble holds the latter firmly in place.

The outside of the inner end of the bushing 20 is provided with a flange 23 which fits a corresponding recess in the end of the drum 24. The drum 24 is of a length to extend, when in place, slightly beyond the outer end of the bushing 20. A threaded plug 25, with a knurled flange, screws into the threads at the end of the bushing and, at its outer edge, presses the spiral drum 24 against the flange 23 to hold the bushing and drum in position relative to each other.

In assembling the parts 14, 20, 22, 24 and 25, the thimble 14, is passed through the opening 21 and is locked to the bushing 20 by placing the screw 22 in place and turning it down on its threads until it locks itself against the head of the thimble 14. The thimble 14 and the micrometer screw attached thereto may now be placed in the mount frame 10. The drum 24 may now be slipped over the bushing 20 and the flanged plug 25 screwed in the end of the bushing to hold the whole assembly together. It will be found that the friction of the flange 23, with the wall of its recess in the drum 24 and also between the drum and the flanged plug 25, will be sufficient to prevent the bushing and drum from turning relatively to each other.

Arranged adjacent the drum 24 is a guide 26 having a slot 27 parallel to the axis of the drum.

The drum 24 is provided with a spiral groove 28 arranged preferably with its pitch in opposite direction to and greater than the pitch of the threads of the screw 13. The pitch should be sufficiently great to afford sufficient space to designate between its convolutions, the graduations corresponding to the angular movements represented by the corresponding angles. It will be understood, of course, that for a given axial movement of the screw 13, a greater pitch will necessitate a greater length of the spiral in drum 24. It has been found that for use on rifle sights that a pitch of 5 or 7 to the inch and a drum length of about one inch will give the desired results for the standard U. S. Army rifle with telescopic sights. For other uses, the conditions of use would determine the dimensions.

An index finger 29 is provided having an indicating edge pointing to the scale divisions on the space between the turns of the spiral groove. This finger 29 is provided with a spiral key 30 fitting the spiral groove 28 to slide therein and a boss 31 to slide in the slot 27 of the guide 26. When the finger, with its boss and key, are in place in the guide and drum groove, a turning of the drum will cause bodily movement of the finger in a direction parallel to the axis of the drum. As the finger is continually being brought adjacent a progressively different portion of the drum, it is only necessary to have appropriate readings on the spaces between the turns of the spiral, to indicate the position of the end of the threaded screw 13 and consequently of the surface with which it is in contact.

In assembling the finger, the knurled plug 25 is removed if in place. The finger is placed with its boss 31 in registry with the slot 27 and the drum turned until the key registers with the groove 28. The drum is now turned until the finger is clear of the end of the drum. The knurled plug 25 is now replaced and screwed down nearly as far as it can go.

In order to have the proper relation of the screw 13 to the finger it is, of course, necessary to calibrate the device. This is done by trial or by measurement and while the parts are properly placed, by making two marks on relatively movable parts and having the marks register when the device is calibrated. Such marks are illustrated at 32 which registers the bushing 20 with the thimble 14 and at 33 which marks permit registration of the bushing 20 with the drum 24.

In using my device on a rifle sight, it is known, at what point on the drum scale, the finger 29 will point when the 0-mark of the scale 15 is opposite a certain mark on the scale 16. Let us suppose that this is 200 yards on the drum scale. If the setting is once made at this range, all other ranges will be correct and it will be necessary to only turn the drum to the desired range without counting the number of turns or the number of scale divisions moved. The range would read directly on the range drum.

If the marks should all be in proper registry and the finger 29 did not point to the proper reading, it would only be necessary to loosen the knurled plug 25 and turn the drum until the proper range was opposite the finger 29 with the notches in registry at 33. The knurled plug 25 would then be screwed down tightly and the setting would be complete.

Figure 2:
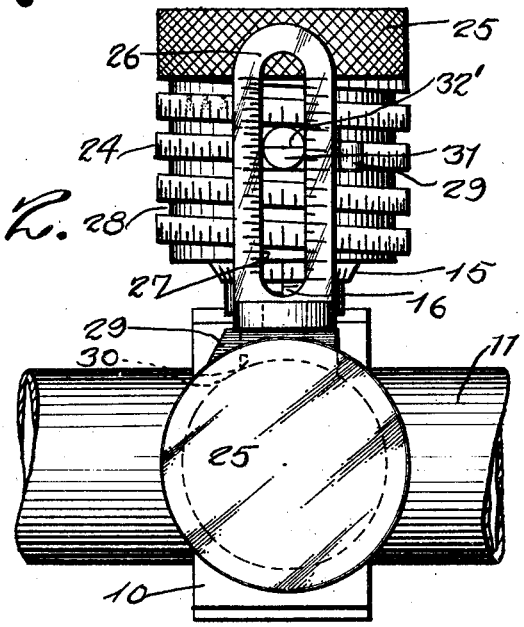
Fig. 2 is a side view of Fig. 1.
Figure 3:
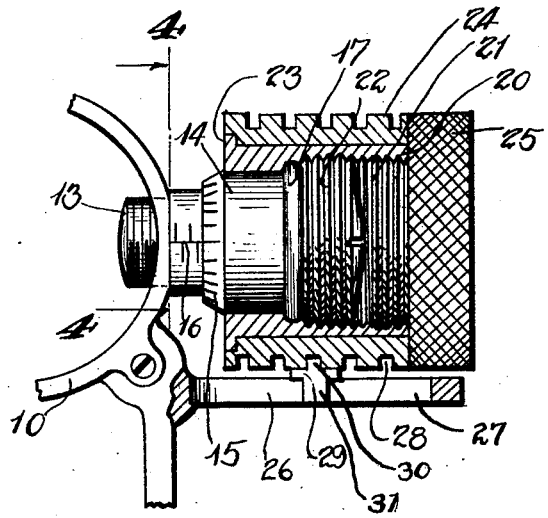
Fig. 3 is a longitudinal cross section of one of the drums shown in Figs. 1 and 2, illustrating its attaching means.
Figure 4:
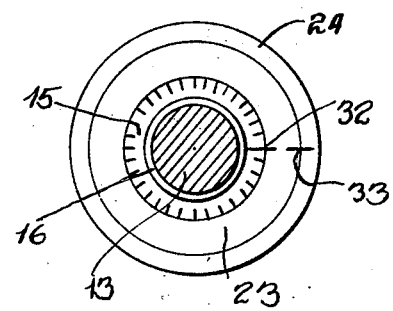
Fig. 4 is a cross section on the line 4—4 of Fig. 3.

In Figs. 1 and 2, two devices are illustrated, one for changes in range setting and one for changes in windage setting. As the principles of operation are the same for both as well as for its application to other uses, it is believed no further description of the operation is necessary.

Figure 5:
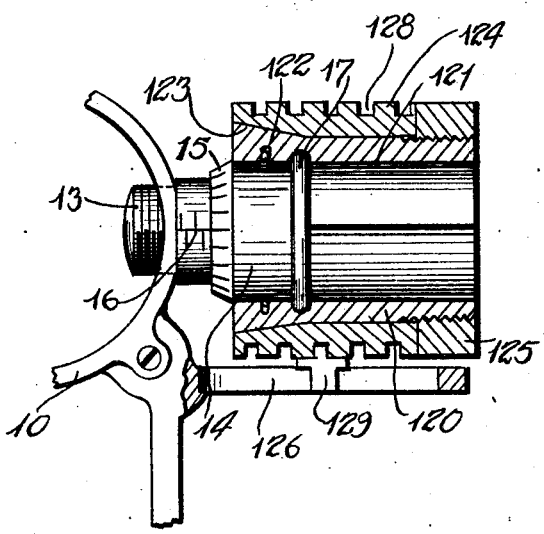
Fig. 5 is a longitudinal cross sectional view similar to Fig. 3 but of a modified form of attaching means.
Figure 6:
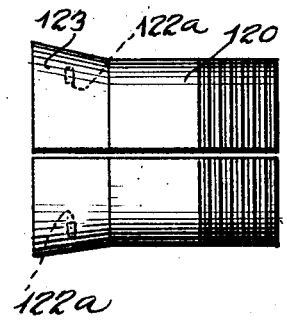
Fig. 6 is a detail view of one of the elements shown in Fig. 5.

In Fig. 5 I have illustrated a modification of the form already described, a pair of elements of which are shown by themselves in Fig. 6.

A two part split bushing 120 is provided having a cylindrical opening 121 at its outer end and another opening to receive the body of the thimble and a groove to receive the headed end. A pin is provided which extends through a portion of the thimble 14 and into, but preferably not through, each half of the split bushing. This pin I have designated by the numeral 122 and its openings in the bushing 120 by the numeral 122ᵃ as shown in Fig. 6.

The outer surface of the bushing 120 is conical at its inner end as at 123, the outer portion being cylindrical. The conical surface 123 fits a corresponding surface within the drum 124.

The outer end of the outside is threaded to receive the threads of a knurled nut 125. The inner surface of this nut 125 bears against the outer end of the drum 124 and the two conical surfaces, already described, are thereby forced into contact with each other to maintain the relation between the split bushing 120 and the drum 124. The drum is provided with a spiral groove 128 similar to the groove 28, and the groove is provided with a finger 129 and guide 126 similar to 29 and 26, respectively in the modification above described.

In assembling the device illustrated in Fig. 5, the pin 122 is placed in its opening in the thimble 14, its ends protruding an equal distance at each end of the opening. The two halves of the bushing 120 are now placed with their openings 122ᵃ over the ends of the pin 122. The drum 124 and finger 129 are assembled in a manner similar to that described for the drum 24 and finger 29. The description of this operation will, therefore, not be repeated.

In addition to the scale on the drum, one or more additional scales may be provided on the face of the guides 26, 126. For example, in using this invention in connection with the setting of rifle sights, it might be desirable to have a scale for 22 caliber ammunition or "guard" ammunition or both. Scales could be placed on the guides 26, 126 as illustrated on Fig. 2, an index line 32' being placed across the face of the boss 31 as a reference.

In rifle shooting work, certain changes may have to be made daily or whenever a rifleman may come to a different range due to atmospheric or other conditions. It will be clear that after the first shot, a correction to the drum may be made by moving the same to the correct place and then loosening the knurled plug 25 or the knurled nut 125, moving the drum 24 or 124 until the finger 29 or 129 reads the correct range and then securing the drum 24 or 124 by the plug 25 or nut 125. This setting for this distance may be easily returned to without resorting to a note book or without charging the memory with the correction. This correction should be correct at other distances as well.

While I have shown and described embodiments of my invention in detail, it is to be understood that I do not limit myself to the exact showing and that modifications and changes may be made without departing from the spirit of my invention and within the scope of the appended claims.

Having described my invention what I claim and desire to secure by Letters Patent is:

1. A micrometer adjusting device comprising an adjusting screw, a bushing mounted coaxially therewith and for angular adjustment thereabout, means for holding the bushing and screw in relatively adjusted position, a drum mounted on the bushing and adjustable angularly thereabout, a spiral scale on the drum, means for holding the drum in adjusted position on the bushing, and an index for indicating readings on the drum, the pitch of the spiral scale being greater than the pitch of the screw.

2. A micrometer adjusting device comprising an adjusting screw, a bushing mounted coaxially therewith and for angular adjustment thereabout, means for holding the bushing and screw in relatively adjusted position, a drum mounted on the bushing and adjustable angularly thereabout, a spiral scale on the drum, means for holding the drum in adjusted position on the bushing, an index for indicating readings on the drum, the pitch of the spiral scale being greater than the pitch of the screw and means for guiding the index in a line substantially parallel to the axis of the drum.

3. A micrometer adjusting device comprising an adjusting screw, a bushing mounted coaxially therewith and for angular adjustment thereabout, means comprising a locking screw threaded within the bushing for holding the bushing and adjusting screw in relatively adjusted position, a drum mounted on the bushing and adjustable angularly thereabout, a spiral groove on the drum, a spiral scale adjacent thereto, means for holding the drum in adjusted position on the bushing, a guide adjacent the drum and extending in a direction parallel to the drum axis, an index member slidable in the guide and having a key in the spiral groove so correlated as to be moved along the guide by the walls of the spiral groove when the drum is rotated.

4. A micrometer adjusting device comprising an adjusting screw, a bushing mounted coaxially therewith and for angular adjustment thereabout, means comprising a locking screw threaded within the bushing for holding the bushing and adjusting screw in relatively adjusted position, a drum mounted on the bushing and adjustable angularly thereabout, a spiral groove on the drum, the groove having a greater pitch than the adjusting screw, a spiral scale adjacent thereto, means for holding the drum in adjusted position on the bushing, a guide adjacent the drum and extending in a direction parallel to the drum axis, an index member slidable in the guide and having a key in the spiral groove so correlated as to be moved along the guide by the walls of the spiral groove when the drum is rotated.

In testimony whereof I hereunto affix my signature.

JOSEPH H. ROBERTSON.